United States Patent [19]

McCracken

[11] Patent Number: 4,987,850
[45] Date of Patent: Jan. 29, 1991

[54] APPARATUS FOR THE WETTING OF SEEDS

[75] Inventor: Alan McCracken, Binningen, Switzerland

[73] Assignee: Ciba-Geigy Corporation, Ardsley, N.Y.

[21] Appl. No.: 358,288

[22] Filed: May 30, 1989

[30] Foreign Application Priority Data

Jun. 6, 1988 [CH] Switzerland .......................... 2140/88

[51] Int. Cl.⁵ ............................................... B05C 5/00
[52] U.S. Cl. .................................... 118/303; 366/156; 366/186
[58] Field of Search ................ 118/303; 366/156, 186; 425/204

[56] References Cited

U.S. PATENT DOCUMENTS

| | | | |
|---|---|---|---|
| 2,538,891 | 1/1951 | Zimmerman et al. | 118/303 X |
| 3,009,826 | 11/1961 | Straughn et al. | 118/303 X |
| 3,155,542 | 11/1964 | Condell et al. | 118/303 |
| 3,198,655 | 8/1965 | Gisiger | 118/303 X |
| 3,548,782 | 12/1970 | Bergquist et al. | 118/303 X |
| 3,652,062 | 3/1972 | Baker | 425/204 X |
| 3,696,736 | 10/1972 | Studli | 425/204 X |

FOREIGN PATENT DOCUMENTS

| | | |
|---|---|---|
| 3239867 | 5/1984 | Fed. Rep. of Germany . |
| 1577656 | 8/1969 | France .................................. 118/303 |
| 2297791 | 8/1976 | France . |
| 487673 | 5/1970 | Switzerland . |
| 665835 | 6/1979 | U.S.S.R. ............................. 118/303 |
| 480203 | 2/1938 | United Kingdom . |

Primary Examiner—Richard L. Chiesa
Attorney, Agent, or Firm—Harry Falber

[57] ABSTRACT

Apparatus whereby seeds, in particular unginned cottonseeds having lint, may be wetted with liquid active ingredients. To achieve this, the cottonseeds are separated in a feeder and metering device having conveyor screws and a baffle, and fitted uniformly into a spray chamber. In the spray chamber an atomizer produces a fine spray mist and wets the dropping seed grains. The grains drop into a mixing and transport chamber wherein they are mixed by mixer and agitator shafts. A conveyor screw transports the seed during the mixing slowly toward an inlet opening.

44 Claims, 6 Drawing Sheets

APPARATUS FOR THE WETTING OF SEEDS

BACKGROUND OF THE INVENTION

The invention relates to an apparatus for the wetting of seeds with active ingredients dissolved in a liquid. Such an apparatus includes a feeder and metering device with an opening directed from above into a spray chamber that is open at the bottom, in which an atomizer for the liquid active ingredient is located, and includes a mixing and discharge means under the spray chamber. In particular, the invention relates to an apparatus for the wetting of unginned cottonseeds which include lint, using active ingredients, such as, for example, insecticides or fungicides.

In agriculture, seeds are treated to protect them against fungi, insects, rotting and the like, by chemical means. For this purpose, the seeds are wetted in appropriate apparatuses uniformly with a liquid containing the necessary active ingredient. The uniform distribution of the active ingredient is important, as both an excessively high or low concentration can endanger the seed, in the first case by the active ingredient itself and in the second, by the lack of any effect. For this reason, a uniform flow of the seed is initially provided, for example by vibrating screening on a conveyor belt. Subsequently, the uniformly distributed material is wetted by the active ingredient on the conveyor belt. It is also possible to wet the seeds while they drop in a shaft.

Not all seeds can be separated by such simple means to obtain a uniform material flow. Cottonseeds, for example, have tiny hairs on their outer skin and therefore tend to form clusters which can no longer be treated by the conventional processes. For this reason, the seeds are delinted in a first working step in order to obtain the necessary material flow properties. Sulfuric acid or hydrochloric acid are customarily used in the process; flame scarfing is another process. After delinting, cottonseeds may be processed as described above.

In DE-A-3 239 867 for example an apparatus for the pickling of delinted seeds is described, in which the seed is divided by the centrifugal action of a rotating grain centrifuging disk, which is part of a metering device, in a treating chamber into a uniform cloud. A spray disk is located immediately following the grain centrifuging disk, which finely divides the liquid pickling agents in said cloud. By the inherent motion of the delinted seeds in this spray mist, the surface of each seed is wetted in a relatively uniform manner.

U.S. Pat. No. 3,155,542 describes a pickling apparatus for cottonseeds. In this apparatus the cottonseeds are brought into a treating chamber by means of a vertical auger type conveyor. In the chamber, they drop onto a rotating cone, which distributes the seed outwardly against the inner wall of the chamber. A rotating spray disk is located under the centrifugal cone, which produces a fine mist of the pickling agent. While dropping, the cottonseeds pass through the mist, whereby their surface is wetted. To prevent the cottonseeds, which are not entirely delinted, from balling up, spatula-like arms are provided to the right and the left of the screw conveyor as baffles, which project into the conveyor and are intended to separate the clusters of cottonseed formed. Although larger clusters are comminuted in this manner, cottonseeds, which are not completely delinted, cannot be scattered individually.

In the case of wet soil, delinting has a detrimental effect on the planting, as the hairs protect the seed against excessive wetness. For this reason delinting is often entirely eliminated.

Special machines are used for the wetting and pickling of cottonseeds that have not been delinted. For example, to separate clustered cottonseed, a vertical filler tube in such an apparatus leads into a truncated cone, the lower end of which opens into a wider tube forming the spray chamber. A rapidly rotating disk is located inside the truncated cone, directly under the end of the tube, which throws the seeds introduced against the walls of the truncated cone, from which they bounce back and drop in the more or less uniform distribution into the spray chamber. The metering of the material flow is controlled by varying the distance of the disk from the end piece of the filler tube, i.e., by the adjustment in height of the disk. For wetting, two other disks are rotating in the axis of the first disk, into the center whereof the liquid active ingredient is introduced. The rotation of the disk is intended to provide a fine, droplet shaped distribution of the liquid in the spray chamber. From below the spray chamber the seeds are transported by means of an auger conveyor into a chamber, wherein they are further mixed mechanically in order to distribute the wetting agent more uniformly over the surface of all of the seed grains.

An essential problem in the aforedescribed layout is posed by the material flow, which is difficult to control. A slight lowering of the rotating disks already leads to the separation of remaining clusters of cottonseeds. The spraying process is again not satisfactory, as the cottonseed in their free fall are not sprayed uniformly from all sides. Furthermore, too much wetting liquid is applied to the walls of the spray tube and is thus lost.

SUMMARY OF THE INVENTION

The present invention is intended to remedy the aforementioned deficiencies. According to the invention, this is attained by an apparatus wherein the feeder and metering device comprises an essentially horizontal screw conveyor with at least two mutually cooperating conveyor screws and a diaphragm-like baffle, wherein the conveyor screws have turns with a depth (t) of the order of magnitude of the seed grains to be treated, and/or that the atomizer is of the type generating a particle size of less than 300 $\mu$m and/or that the mixing and discharge means includes at least one conveyor screw and at least one mixer shaft located parallel to the conveyor screw and equipped with agitator paddles or the like.

As a result of the depth of the conveyor screw turns being limited to the order of magnitude of the seed grains to be treated, clusters of the hairy seeds are reliably broken up. The mechanical baffles prevent the transportation of material outside the auger turns. The screw conveyors provide a uniform and constant material flow to the spray chamber. The use of an atomizer, which generates a fine, dense spray mist, makes possible the uniform wetting of the seeds from all sides.

The mixing and conveyor apparatus formed by the combination of conveyor screws and agitator baffles represents an optimum solution relative to compactness and effects an optimal solution.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE DRAWINGS AND THE INVENTION

Figure 1:
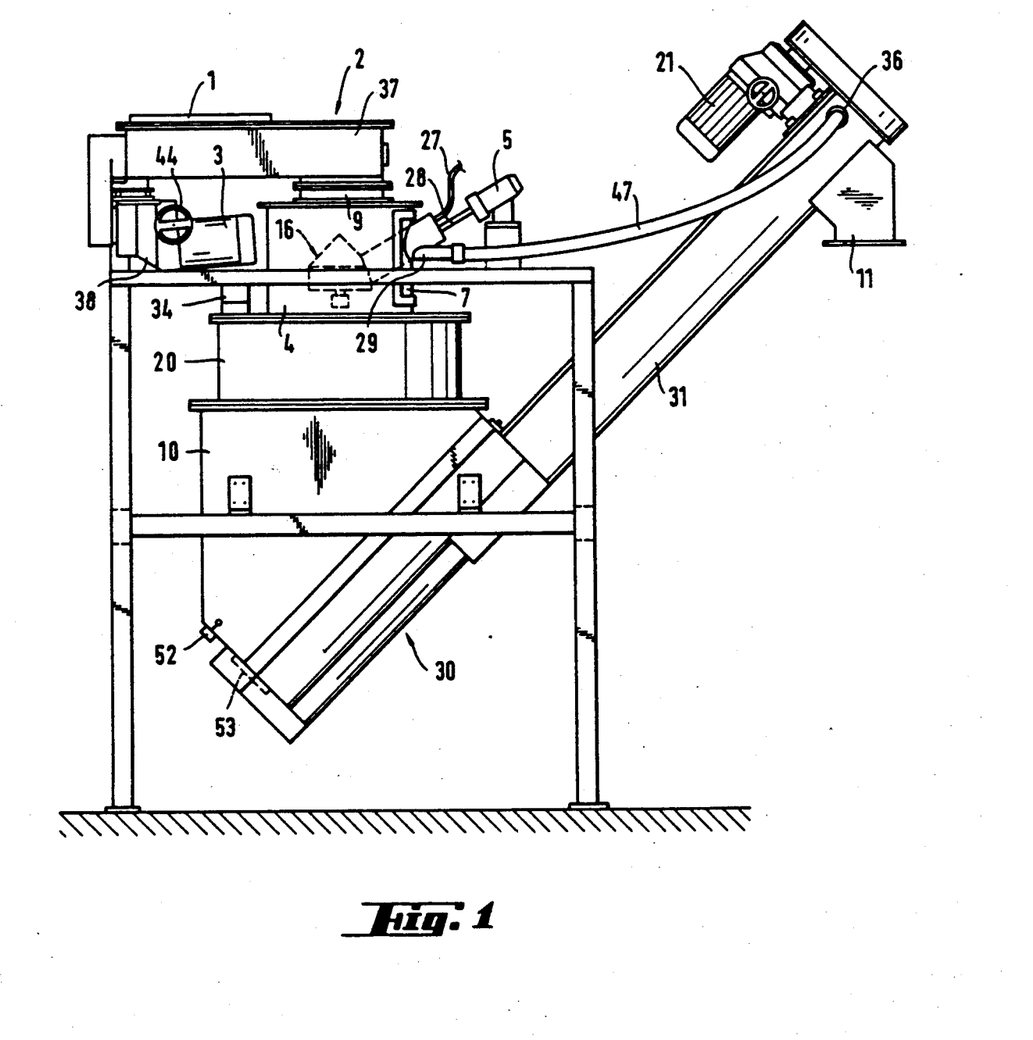
FIG. 1 shows a lateral elevation of the entire apparatus.

In the figures, 2 designates the feeder and metering device, 4 the spray chamber and 10 the mixing and conveyor chamber. FIG. 1 clearly shows the configuration of the entire apparatus. A filler opening 1 is located above the feeder and metering device 2, which opens into the spray chamber 4. Under the spray chamber 4 the mixing and conveyor chamber 10 is located, from which the seeds are transported to the outlet 11.

The feeder and metering device 2 consists of a horizontal screw conveyor, which comprises a housing 37 and four screw conveyors 12-15. At its inlet, over the conveyor screws 12-15, the filler opening 1 is located.

On the outlet side, the screws terminate over the opening 9 forming the inlet of the spray chamber 4. Between the openings 1 and 9 the conveyor screws are led through a narrowing formed by a diaphragm-like baffle 22. Interacting gear wheels 40-43 are located in a housing 37 at the filler opening 1, on the shafts of the screw conveyors 12-15. They transmit the driving forces, wherein the shaft 15 is driven via a toothed belt 39, by an electric motor 3. A gear 38 with a variable transmission ratio reduces the rotational velocity of the motor to the degree desired. A manual wheel 44 is used in the regulation.

Figure 4:
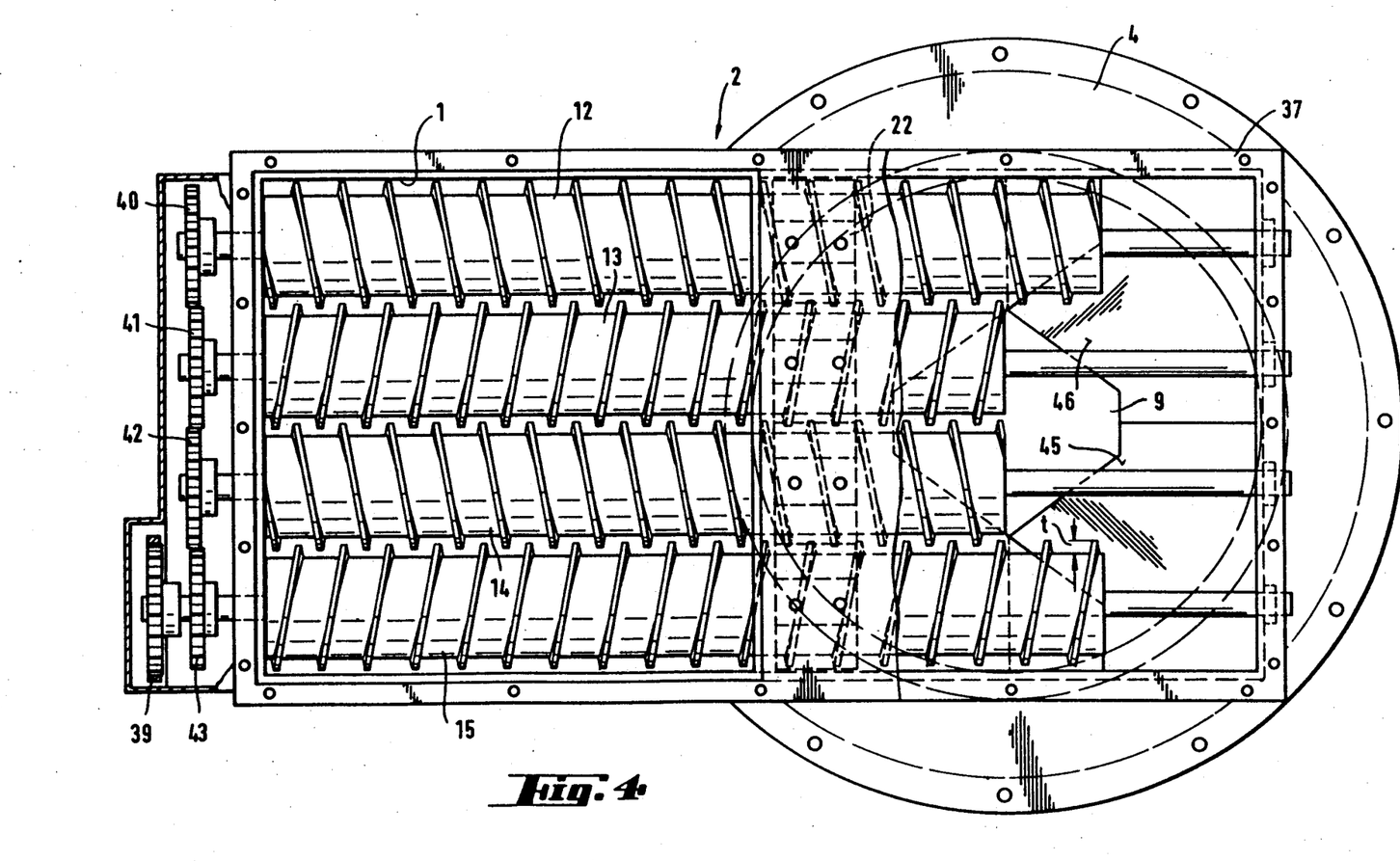
FIG. 4 shows a top elevation of the feeder and metering device designated 2 in FIG. 1.

For the depth t (FIG. 4) of the turns of the conveyor screws 12-15 in the present exemplary embodiment, a value of 18 mm is chosen. The clustered seeds are thereby separated very well. A high rate of transportation is obtained simultaneously. Generally, depths between about 10 mm and 30 mm are appropriate. This corresponds approximately to two to six times the size of a grain of cottonseed. Values of up to 50 mm can also be used. Thus, the screw turns could have a depth of 1.3 to 10 times the size of the grains to be treated. Beyond this, the dissolution of the clustered seeds and thus, the later uniform distribution of the active ingredients, is no longer assured.

Of equal importance for the separation of clustered seeds is the baffle 22 in the housing 37. The recesses between the conveyor screws and between one conveyor screw and the wall of the housing 37, are also covered in a comb-like manner. The distance between the shoulders of the screws and the inner edge of the baffle is smaller than 0.5 to 5 times the size of a seed grain to be treated. The baffle 22 in the preferred embodiment of the invention leaves open a gap of only about 10 mm to 20 mm through its triangular combs between the shoulders of the screws and the opposing baffle 22.

The essential function of the baffle 22 is to permit transport within the turns of the conveyor screws only. The form of the baffle 22 is not critical. The combs may follow the contours of the shaft in approximately semi-circular shapes, so that the distance to the shoulders of the screws remains constant. In this case a distance smaller than five times the size of a seed grain - about 20 mm for cotton - is suitable.

On the bottom side of the screw conveyor the housing 37 narrowly follows over its entire length the contours of the screws 12-15, so that no seed residues are formed in operation on the walls of the housing. This reduces cleaning operations to a minimum.

The conveyor screws 12-15 terminate over the opening 9 of the spray chamber 4. The two intermediate screws 13, 14 are shorter, whereby a uniform distribution over the cross section of the spray chamber 4 is obtained. Two sheet metal plates 45, 46 divert the seeds from the edge of the screw conveyor toward the center of the opening 9.

The housing of the spray chamber 4 is formed by a vertically standing hollow cylinder. In its center, under a conical hood 23 and a short cylindrical intermediate piece 48, the spray head 16 of a portable spray apparatus of MICRONAIR AERIAL LTD, Model AU 7000, is located. Over an obliquely ascending tubular piece 49, the hood 23, the cylindrical piece 48 and the spray head 16, are mounted on an assembly door 7. The drive shaft 28 and the feeder line 27 of the spraying medium are led through this tubular piece 49 in the spray chamber 4, to the spray head 16. A blower 18 in the spray head 16 also receives its suction air through this tubular piece from an air inlet 29. By opening the assembly door 7, the spray head 16 may be pivoted out together with the easily released hood 23 and the cylindrical piece 48, from the spray chamber 4, for cleaning or dismantling.

Figure 5:
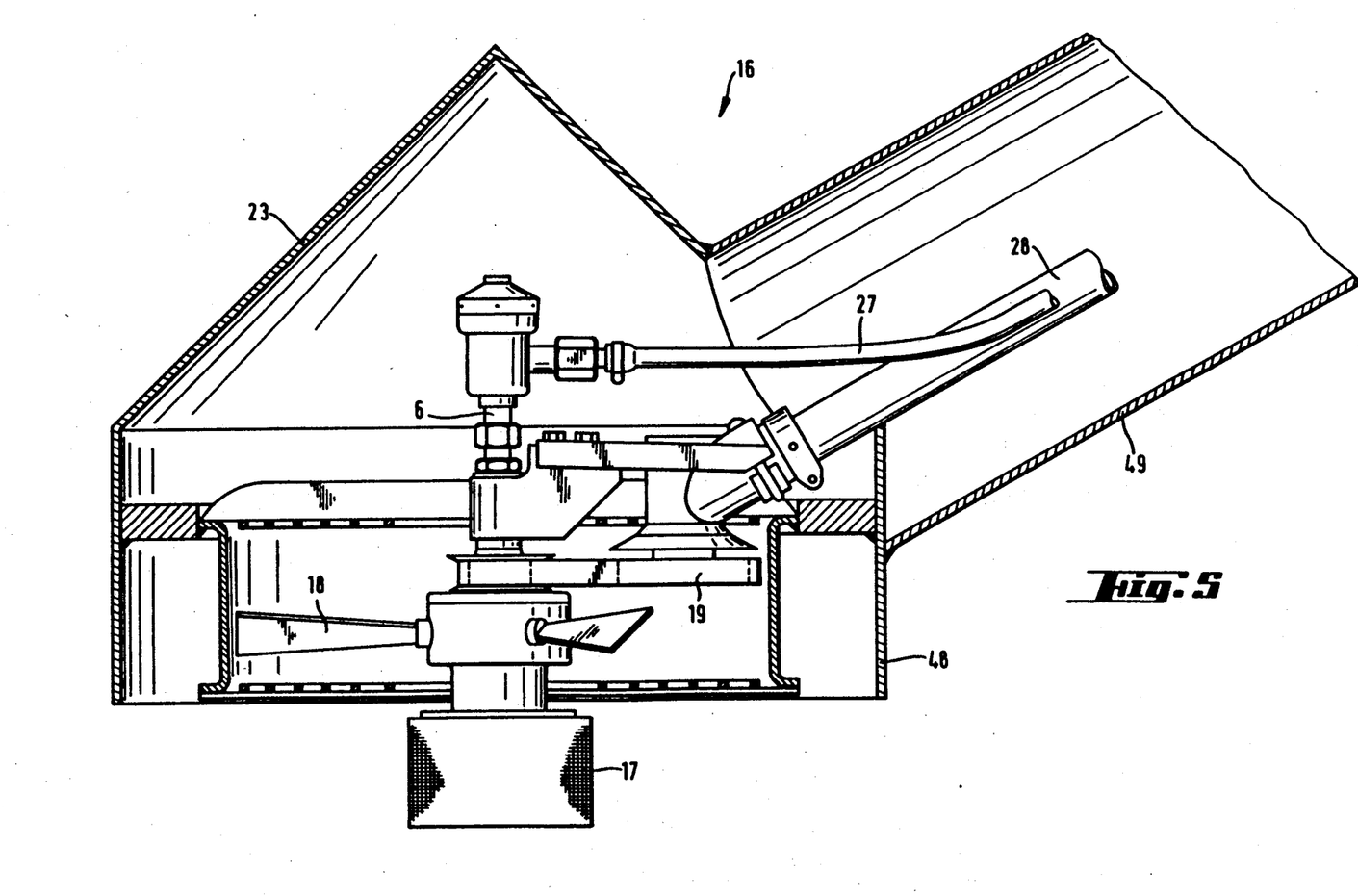
FIG. 5 shows the spray head with the rotating cage atomizer in an axial section.

In the spray head 16, a rotating cage atomizer 17 is located at the bottom, with two concentric cylindrical cages. The outer cage consists of a fine wire mesh (hole size 1 mm$^2$), while the inner cage is made of perforated sheet metal. Above this, on the same axle, the blower 18 is located. Both the atomizer 17 and the blower 18 are driven via a toothed belt 19 and the drive shaft 28, by a motor 5 located outside the chamber 4.

At the height of the atomizer 17, two scrapers 8 travel over the inside of the spray chamber wall and scrape residues from the wall within the spraying area of the atomizer 17. The scrapers 8 are mounted on a sprocket 35 driven by an electric motor 34.

The spraying apparatus produces a very fine spray mist, the particle diameter of which amounts to an average of about 100 $\mu$m at 5000 rpm. (This value is valid for liquids with the viscosity of water. More viscous active ingredients form correspondingly larger droplets.) The liquid active ingredient arrives through the feeder line 27 and the hollow axle 6 at the atomizer 17. An essential advantage of the rotating cage atomizer consists of that droplet formation does not take place in one plane only, as with rotating disks. It is possible by simple design measures, such as for example by a tighter mesh in the cages, to produce smaller droplets, or to use cages with larger hole diameters with highly viscous active ingredients.

The air inlet 29 of the blower 18 is connected by a hose 47 with an opening 36 at the outlet 11 of the overall apparatus. From here, the blower 18 suctions in air and drives and swirls the radially flying droplets of the atomizer 17 downward into the mixing and transport chamber. There, the air returns along a conveyor screw 26 at the outlet 11 through the opening 36. The air circulation created in this manner prevents the contamination of the air of the environment with the active ingredient.

In operation, the seeds drop from above into the spray chamber 4 and are diverted by the hood 23 to the outside. At the level of the cage atomizer 17 wetting begins. It is supported by the air vortex produced by the blower 18. The wetted cottonseeds drop through an intermediate housing 20 into the mixing and transport chamber 10.

Figure 6:
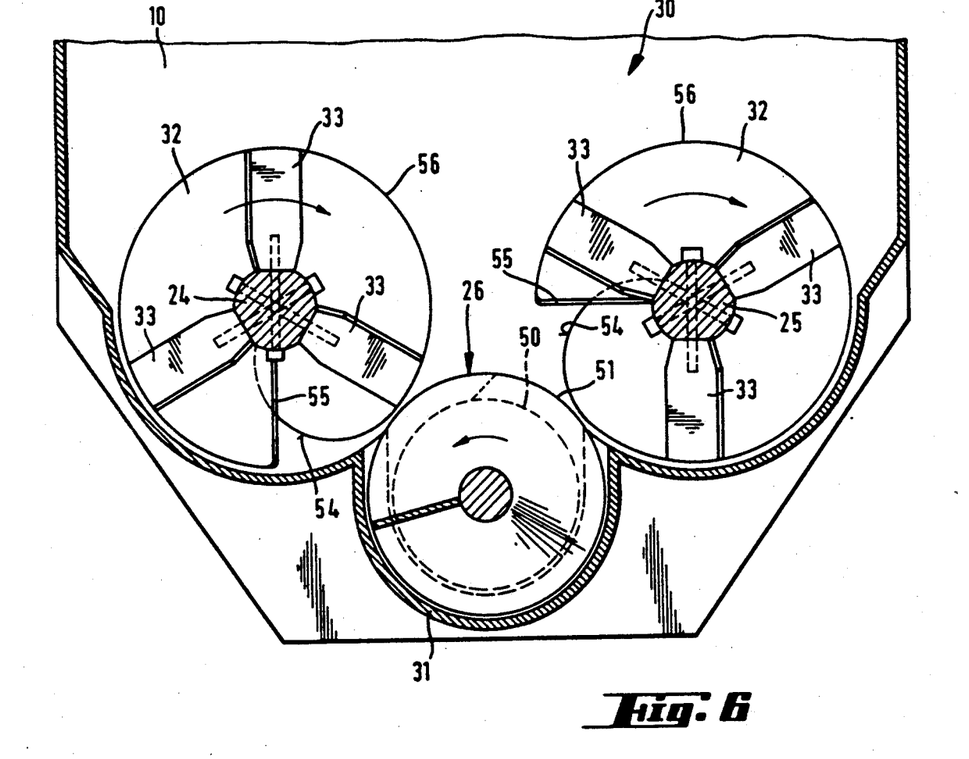
FIG. 6 shows a section on the line 6—6 of FIG. 2.
Figure 7:
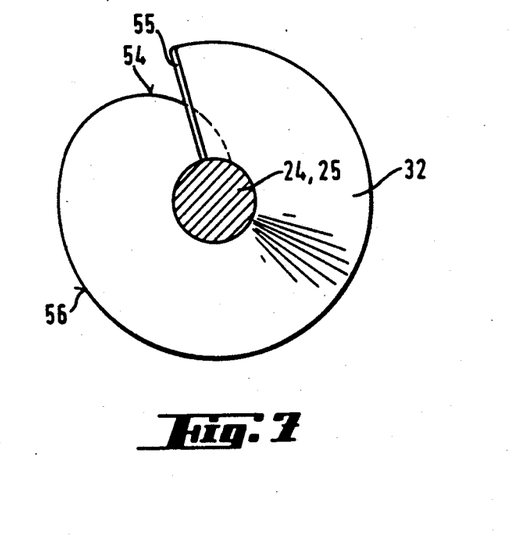
FIG. 7 shows a section through a modified mixer shaft with a view of an auger turn.

The mixing and transport chamber 10 contains the conveyor screw 26, which leads at an approximate angle of 45° obliquely upward to the outlet 11. In the initial zone 50 the screw turns have a low pitch, while in the outlet zone 51 they are steeper. Above the conveyor screw 26 and parallel to it, two additional shafts 24, 25 (FIG. 6) are located, which are in the form of alternating screw turns 32 and paddle mixers 33. In a preferred embodiment, the screw turns 32 always extend only over a full circumference of the shaft. For example, positions of the screw turns as shown in FIG. 7 are at 380°. Following this, three wing-like paddles 33 are distributed over the circumference of the shaft. The shafts 24, 25 are located in a channel-like housing 31 which is open on top to the spray chamber and fitted thereto. As viewed in the direction of rotation, the shoulder of the screw turn 56 (FIG. 7) and the front edge 54 of a screw turn 32 form a gradually rounded, flowing transition. In contrast, the rear edge 55 and the screw shoulder 56 are at approximate right angles relative to each other. The mixer shafts 24, 25 are restricted to the inside of the mixing and transport chamber 10. They are driven by the conveyor screw 26 over the gearwheels. At the outlet 11, a motor 21 drives the conveyor screw 26 by means of a variable gear similar to that of the conveyor and metering device 2.

Figure 2:
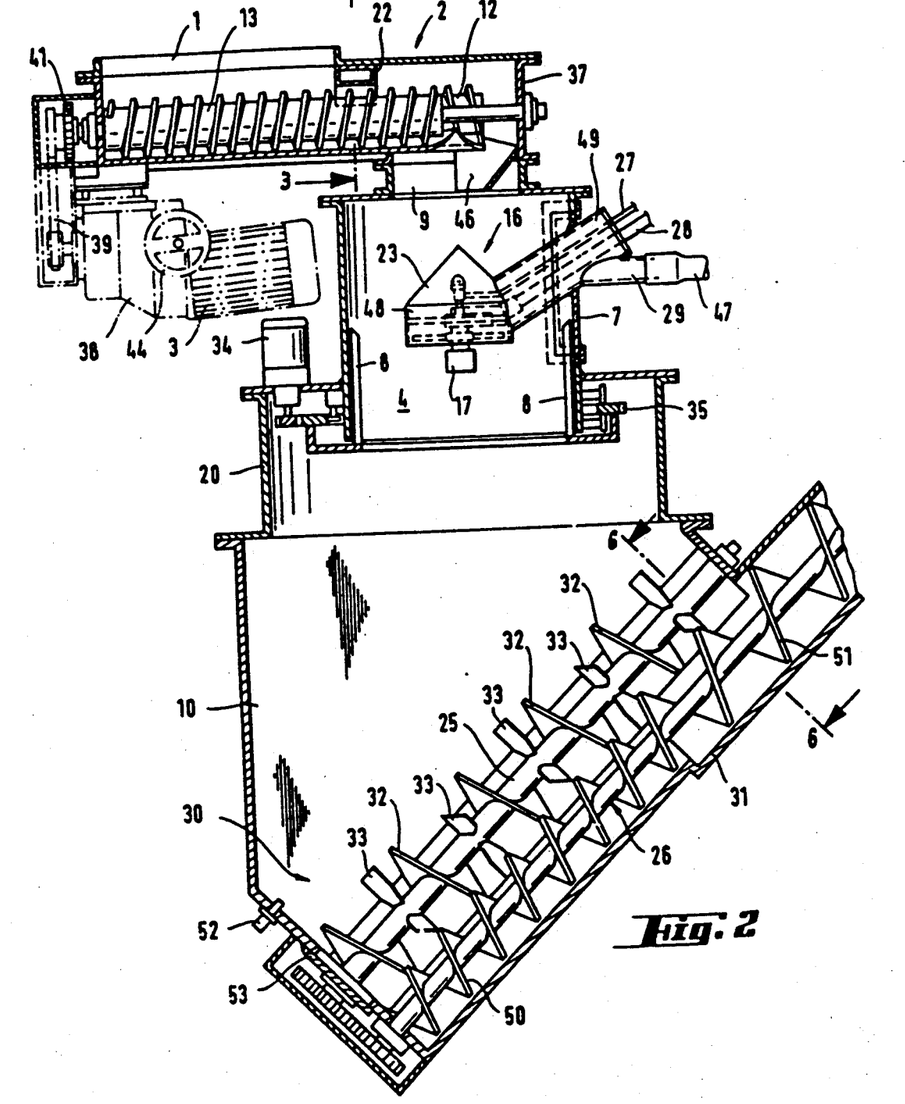
FIG. 2 shows an enlarged section of FIG. 1.
Figure 3:
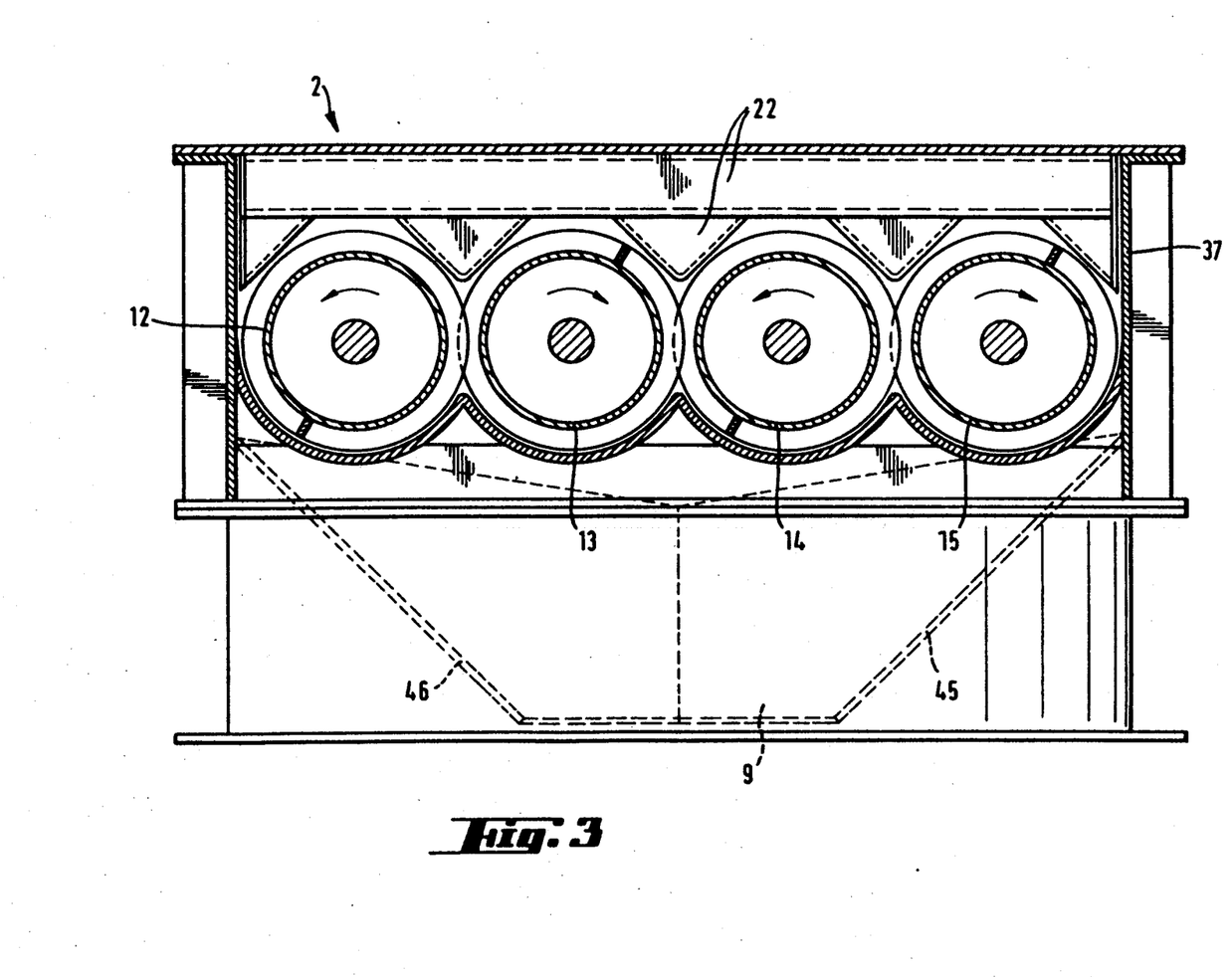
FIG. 3 shows a cross section on the line 3—3 of FIG. 2.

A commercial, capacitive proximity switch 52 (FIG. 2), connected with a conventional electrical circuit (not shown), actuates the mixing and discharge means 30 only if a predetermined quantity of seeds is present in the mixing and transport chamber 10.

In the mixing and transport chamber 10, on the one hand irregularities of wetting in the spray chamber are equalized, and on the other hand, the descending spray mist distributed. For this purpose, the mixer shafts 24, 25 may also be for example, in the form of pure paddle mixers. A configuration of the mixing device with only one mixer shaft is also conceivable, together with different rotating velocities of the individual shafts.

In the mixing operation the screw 26 conveys the seeds slowly only in the direction of the outlet 11. This material flow is supported by the individual screw turns 32 on the mixer shafts 24, 25. Further up, the flow of the material is accelerated by the greater pitch (51) of the screw turns.

The conveyor screw 26 runs on the bottom side in a channel with a tight clearance, so that only minimal residues or none at all, are formed. For the same reason, the transition of the screw shoulder 56 toward the front edge 54 of the screw turns 32 on the mixer shafts 24, 25 is low and flowing. Due to the oblique rise of the conveyor screw 26 a small residue of seeds remains at the lower end of the mixing and transport chamber 10. This residue can be removed by opening a door 53. The residue increases with steeper angles. The angle should be in the range of 30° to 60° but should not exceed 60°. In the exemplary preferred embodiment, the angle should be 35° to 45°.

The outlet 11 and the inlet 1 of the apparatus are located (due to the oblique position of the conveyor screw 26) at approximately the same level. In this manner, the structural height of the overall installation may be utilized optimally, in particular if a bag filling machine is connected.

It is, of course, possible to embody the invention in other specific forms than those of the preferred embodiments described above. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

What is claimed is:

1. Apparatus for the wetting of seeds with active ingredients dissolved in a liquid, said apparatus comprising:
    a feeder and metering device, an opening of which is directed from above into a spray chamber having an open bottom, the feeder and metering device including an essentially horizontal screw conveyor with at least two mutually cooperating conveyor screws and a baffle extending into a portion of a space between said screws, the conveyor screws having turns with a depth of an order of magnitude of the seed grains to be treated; and an atomizer for a liquid active ingredient, said atomizer being located in the bottom of the spray chamber, the atomizer generating a particle size of less than 300 μm; and a mixing and discharge means located under the spray chamber, the mixing and discharge means including at least one conveyor screw and at least one mixer shaft located parallel to said mixing and discharge means conveyor screw, said at least one mixer shaft being equipped with agitator paddles.

2. Apparatus according to claim 1, wherein the seeds are unginned cottonseeds which include lint.

3. Apparatus according to claim 2, wherein the active ingredients are insecticides.

4. Apparatus according to claim 2, wherein the active ingredients are fungicides.

5. Apparatus according to claim 1, wherein the screw turns have a depth 2 to 5 times the size of the seed grains to be treated, and the distance between shoulders of the screw turns and an inner edge of the baffle is smaller than 0.5 to 5 times the size of a seed grain to be treated.

6. Apparatus according to claim 1, wherein the screw turns have a depth of 1.3 to 10 times the size of the seed grains to be treated, and the distance between shoulders of the screw turns and an inner edge of the baffle is smaller than 0.5 to 5 times the size of a seed grain to be treated.

7. Apparatus according to claim 6, wherein the screw conveyor comprises at least three mutually cooperating conveyor screws at the same height, with two outside screws being longer in the area of the feeder and metering device opening into the spray chamber, such that their ends project further into the opening than an at least one inner screw.

8. Apparatus according to claim 7, wherein the atomizer is a rotating atomizer with two coaxial cages.

9. Apparatus according to claim 8, wherein the spray chamber is a circular cylinder.

10. Apparatus according to claim 9, wherein at least one blower is provided to produce air turbulence in the spray chamber.

11. Apparatus according to claim 10, wherein the at least one blower is located in the spray chamber above the atomizer.

12. Apparatus according to claim 11, wherein the at least one blower is located so that the air produced by it is directed at the atomizer and flows around it.

13. Apparatus according to claim 12, wherein at least in a wall zone of the spray chamber located within a spraying range of the atomizer, at least one scraper acting on said wall zone is rotatably driven.

14. Apparatus according to claim 13, wherein above the atomizer an approximately conical cover is located.

15. Apparatus according to claim 13, wherein above the blower an approximately conical cover is located.

16. Apparatus according to claim 13, wherein above the atomizer and the blower an approximately conical cover is located.

17. Apparatus according to claim 16, wherein the approximately conical cover is mounted in a readily removable manner.

18. Apparatus according to claim 17, wherein the atomizer is mounted on an assembly door of the spray chamber and is pivotable to a position outside said spray chamber together with said door after the door has been unlocked.

19. Apparatus according to claim 17, wherein the blower and the approximately conical cover are mounted on an assembly door of the spray chamber and are pivotable to a position outside said spray chamber together with said door after the door has been unlocked.

20. Apparatus according to claim 17, wherein the atomizer, the blower and the approximately conical cover, are mounted on an assembly door of the spray chamber and are pivotable to a position outside said spray chamber together with said door after the door has been unlocked.

21. Apparatus according to claim 20, wherein the at least one mixing and discharge means conveyor screw and at least one mixer shaft are located in a fitted channel-like housing opening on top into the spray chamber.

22. Apparatus according to claim 21, wherein two paddle agitator shafts are located at the same height and parallel to each other above the at least one mixing and discharge means conveyor screw.

23. Apparatus according to claim 22, wherein the mixing and discharge means includes at least one shaft, carrying alternating portions of screw turns and paddles, and being located in the channel-like housing which is open on top to the spray chamber and fitted thereto.

24. Apparatus according to claim 23, wherein the portions of screw turns are at 380°.

25. Apparatus according to claim 24, wherein the mixing and discharge means conveyor screw, the paddle agitator shafts and the fitted channel-like housing rise obliquely upward toward an outlet.

26. Apparatus according to claim 25, wherein said rise is within a range of angles of 35° to 45°.

27. Apparatus according to claim 25, wherein said rise is within a range of angles of 30° to 60°.

28. Apparatus according to claim 27, wherein the spray chamber has an air inlet for the blower connected with an air outlet at an end of the mixing and discharge means conveyor screw, so that air moved through the spray chamber forms a closed system.

29. Apparatus according to claim 27, wherein a front edge of screw turns of the at least one mixer shaft is passed into screw shoulders in a flowing, rounded manner.

30. Apparatus according to claim 1, wherein the screw conveyor comprises at least three mutually cooperating conveyor screws at the same height, with two outside screws being longer in the area of the feeder and metering device opening into the spray chamber, such that their ends project further into the opening than an at least one inner screw.

31. Apparatus according to claim 1, wherein the atomizer is a rotating atomizer with two coaxial cages.

32. Apparatus according to claim 1, wherein the spray chamber is a circular cylinder.

33. Apparatus according to claim 1, wherein at least in a wall zone of the spray chamber located within a spraying range of the atomizer, at least one scraper acting on said wall zone is rotatably driven.

34. Apparatus according to claim 1, wherein at least one blower is provided to produce air turbulence in the spray chamber.

35. Apparatus according to claim 34, wherein above the atomizer and the blower an approximately conical cover is located.

36. Apparatus according to claim 35, wherein the atomizer, the blower and the approximately conical cover, are mounted on an assembly door of the spray chamber and are pivotable to a position outside said spray chamber together with said door after the door has been unlocked.

37. Apparatus according to claim 1, wherein the at least one mixing and discharge means conveyor screw and at least one mixer shaft are located in a fitted channel-like housing opening on top into the spray chamber.

38. Apparatus according to claim 1, wherein the mixing and discharge means includes at least one shaft, carrying alternating portions of screw turns and paddles, and being located in a channel-like housing which is open on top to the spray chamber and fitted thereto.

39. Apparatus according to claim 1, wherein two paddle agitator shafts are located at the same height and parallel to each other above the at least one mixing and discharge means conveyor screw.

40. Apparatus according to claim 39, wherein the mixing and discharge means conveyor screw, the paddle agitator shafts and a fitted channel-like housing rise obliquely upward toward an outlet.

41. Apparatus according to claim 1, wherein the spray chamber has an air inlet for a blower connected with an air outlet at an end of the mixing and discharge means conveyor screw, so that air moved through the spray chamber forms a closed system.

42. Apparatus for the wetting of seeds with active ingredients dissolved in a liquid, said apparatus comprising:
 a feeder and metering device, an opening of which is directed from above into a spray chamber having an open bottom, the feeder and metering device including an essentially horizontal screw conveyor with at least two mutually cooperating conveyor screws and a baffle extending into a portion of a space between said screws, the conveyor screws having turns with a depth of an order of magnitude of the seed grains to be treated; an atomizer for a liquid active ingredient, said atomizer being located in the bottom of the spray chamber, and, a mixing and discharge means located under the spray chamber.

43. Apparatus according to claim 42, wherein said atomizer generates a particle size of less than 300 μm.

44. Apparatus according to claim 42, wherein said mixing and discharge means includes at least one conveyor screw and at least one mixer shaft located parallel to said mixing and discharge means conveyor screw, said at least one mixer shaft being equipped with agitator paddles.

* * * * *